United States Patent Office 3,635,931
Patented Jan. 18, 1972

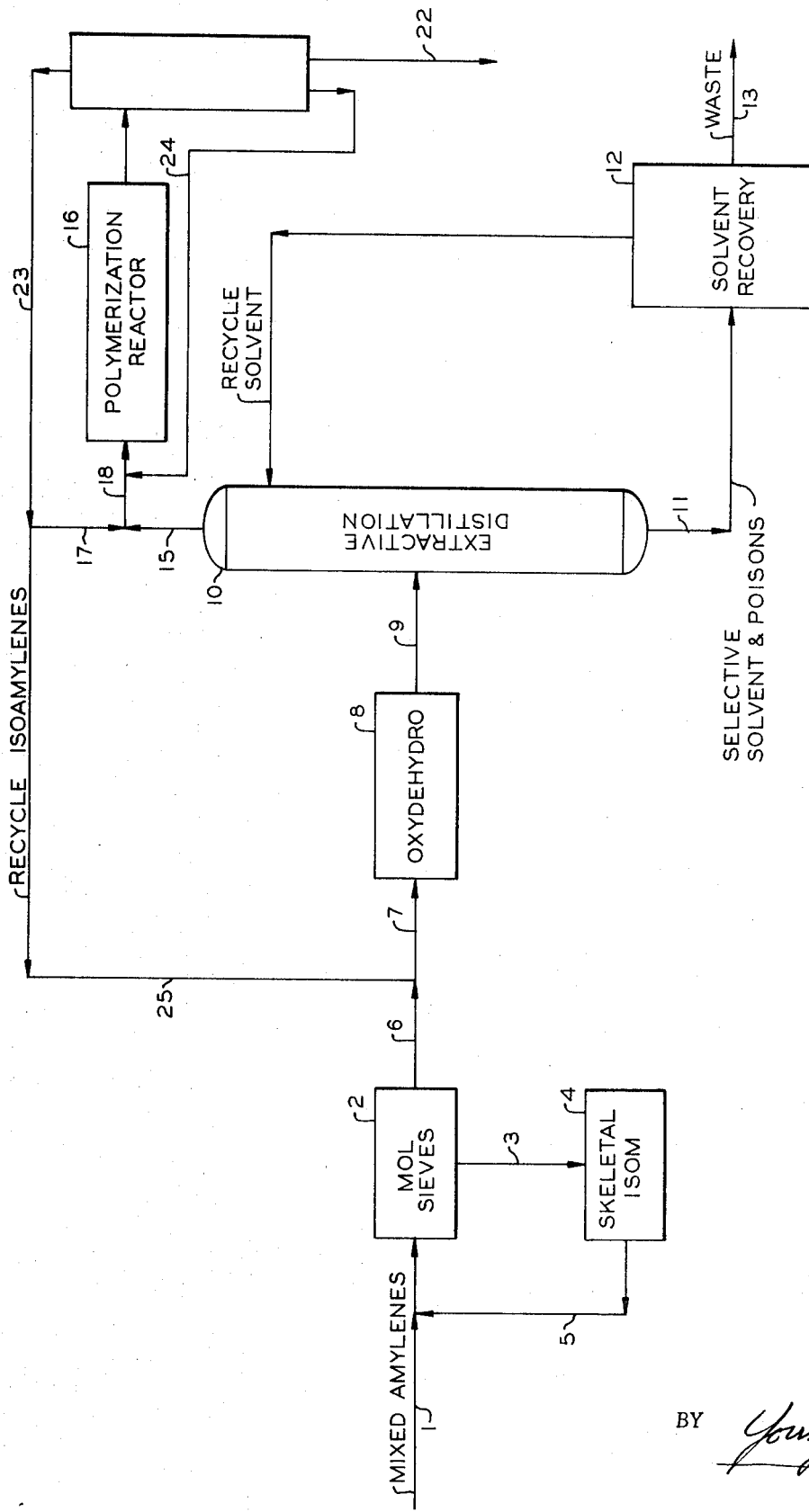

3,635,931
**POLYISOPRENE FROM AMYLENES VIA n-AMYL-
ENE ISOMERIZATION, OXIDATIVE DEHYDRO-
GENATION, EXTRACTIVE DISTILLATION, AND
POLYMERIZATION OF LOW-CONCENTRATION
ISOPRENE**
Joseph W. Davison, Bartlesville, Okla, assignor to
Phillips Petroleum Company
Filed Dec. 22, 1969, Ser. No. 887,282
Int. Cl. C08d 3/10
U.S. Cl. 260—94.2          10 Claims

ABSTRACT OF THE DISCLOSURE

A process for the production of polyisoprene from a relatively low-concentration isoprene stream obtained from a feedstock of mixed amylenes. Isoamylenes are separated from n-amlyenes by molecular sieves, isoamylenes in part dehydrogenated to isoprene, catalyst poisons removed by extractive distillation, and the isoprene contained in the stream then polymerized to synthetic rubber. The n-amylenes separated by use of the molecular sieves are skeletally isomerized to isoamylenes and recycled to the molecular sieve separation.

---

This invention relates to the production of polyisoprene. In somewhat differing aspect, it relates to a method of producing, from mixed amylenes, a purified low-concentration isoprene stream suitable for polymerization.

Cis-polyisoprene is a valuable synthetic rubber and can replace natural rubber in many applications. Natural rubber is not a domestically produced product in the United States, and sometimes is in short supply or faces potential cutoff.

Even greater use can be made of polyisoprene if the cost of its production can be reduced.

Refinery-produced mixed amylene streams of low purity and relatively low cost and value represent potential sources of economically produced polyisoprene.

I have discovered and developed an effective and economical method of utilizing low value, low cost refinery-produced mixed amylenes streams as a source of isoprene and ultimately polyisoprene. Thus, I upgrade these refinery streams containing a series of $C_5$ components by ultimately producing polyisoprene, and at the same time reduce the cost of the polyisoprene so produced.

It is an object of my invention to produce polyisoprene from a mixed amylenes feedstock. A further object is to effectively convert a mixed amylenes feedstock to a low-concentration isoprene stream suitable for polymerization.

Other aspects, objects, and the several advantages of my invention will be apparent to one skilled in the art from the following description, attached flow sheet drawing, and appended claims.

The simplicity and effectiveness of the process of my invention can be more completely understood by referring to my drawing. The process of my invention is shown on the drawing as a flow diagram of the several elements and the fluid-flow relationship therebetween.

Briefly, a stream of mixed amylenes is first contacted with molecular sieves. The molecular sieves separate the isoamylenes from the n-amylenes by preferentially adsorbing the n-amylenes and passing the isoamylenes on through. The n-amylenes are periodically desorbed from the molecular sieves and conducted to a skeletal isomerization reaction zone for conversion in part to isoamylenes and then recycled to the molecular sieve adsorption step.

The isoamylenes are subjected to dehydrogenation and converted at least in part to isoprene. The effluent stream from dehydrogenation is relieved of potential catalyst poisons by extractive distillation. The purified relatively low-concentration isoprene stream is subjected to polymerization conditions and at least a part of the isoprene polymerized to polyisoprene. Polyisoprene is separated and recovered as a product; unpolymerizable components are recycled, solvent to the polymerization zone, and other components to the polymerization zone or otherwise to the dehydrogenation zone.

Referring to my flow diagram, now, with more particularity, stream 1 is the entering feed stream of mixed amylenes, including 3-methylbutene-1, 2-methylbutene-1, 2-methylbutene-2, pentene-1, cis-pentene-2, trans-pentene-2. The first three enumerated are considered isoamylenes; the latter three n-amylenes. The general term amylenes encompasses all of these components.

The stream 1 of refinery-derived mixed amylenes is contacted by molecular sieves 2 of suitable pore size as hereinafter discussed. The molecular sieves 2 preferentially adsorb n-amylenes and substantially pass isoamylenes. The molecular sieves 2 have a limited capacity to adsorb n-amylenes, and must be periodically desorbed in order to be further utilized in picking up additional n-amylenes. The desorbed n-amylenes are recovered and conducted 3 to a skeletal isomerization zone 4 and subjected to skeletal isomerization conditions so that at least a portion of the n-amylenes are converted to isoamylenes. The effluent 5 from the skeletal isomerization zone 4 is returned to the molecular sieve contacting zone 2 as a portion of the feed thereto by joining the make-up stream 1.

The isoamylenes 6 pass through the molecular sieve zone 2 and are conducted to a dehydrogenation zone 8, preferably an oxidative dehydrogenation zone. Normally, a proportion of unreacted materials separated from the final polymer production is also returned as stream 25 to be combined with isoamylenes stream 6 as the combined feed 7 to dehydrogenation zone 8.

Dehydrogenation 8 converts a large proportion of the isoamylenes contained in the feed stream 7 to isoprene. However, the effluent stream 9 from dehydrogenation 8, while having a desirable isoprene content, also now contains minor amounts of acetylenes, and the like, which are poisons to polymerization catalysts. Therefore, effluent stream 9 must first be treated to reduce its poisons content. This is accomplished in extractive distillation zone 10 which utilizes a selective solvent to dissolve out substantially all of the poisons. The solvent and poisons, the bottoms product 11 from extractive distillation 10, are conducted to a separation zone 12 where the poisons are removed as waste stream 13, and the extractive solvent then is recycled 14 for further extractive distillation requirements.

The isoprene-containing stream 15, now substantially free of catalyst poisons, is conducted to a polymerization zone or reactor 16 suitable for polymerizing relatively low-concentration isoprene streams. If desired, a portion of the separated recycle stream 17 of unreacted components from reactor 16 can be added to the isoprene-containing stream 15 to form reactor feed stream 18. While such recycle stream 17 is very low in isoprene, its content of isoprene is valuable, and some of this can be polymerized on recycle. The combined feed 18 to reaction zone 16 consists of purified isoprene stream 15 and recycle stream 17, plus recycle polymerization solvent 24 where such a solvent is used, as discussed hereinafter relative to polymerization conditions.

Following polymerization, the polymerization effluent 19 is conducted to a separation zone 21 for recovery of the polyisoprene as product 22, and unreacted components other than polymerization solvent are removed as recycle stream 23. Polymerization solvent, if any, is recycled 24 to become a part of reactor feed 18 to polymerization zone 16.

To illustrate even more clearly the transformation that take place, the following table is included to demonstrate the results of application of my process to a typical refinery mixed amylenes stream. The stream numbers refer to the streams shown on the accompanying flow-sheet.

TABLE I.—STREAM COMPOSITIONS, LBS./HR.

| Component | (1) Refinery amylenes | (3) Normal amylenes | (5) Isomerization effluent | (6) Iso-amylenes | (25) Recycle to dehydrogenation | (7) Total feed to dehydrogenation | (9) Dehydro-effluent | (13) Reject | (14) Solvent | (15) Extractive distillation overhead | (17) Recycle | (19) Polymerization effluent | (23) Recycle | (22) Product |
|---|---|---|---|---|---|---|---|---|---|---|---|---|---|---|
| 3-methylbutene-1 | 70 | 1 | 35 | 104 | 27 | 131 | 25 | 3 | 0 | 22 | 344 | 366 | 371 | 0 |
| 2-methylbutene-1 | 420 | 3 | 204 | 621 | 160 | 781 | 156 | 6 | 0 | 150 | 2,040 | 2,190 | 2,200 | 0 |
| 2-methylbutene-2 | 814 | 7 | 398 | 1,205 | 308 | 1,513 | 304 | 4 | 0 | 300 | 3,925 | 4,225 | 4,233 | 0 |
| Pentene-1 | 75 | 115 | 43 | 3 | 0 | 12 | 12 | 3 | 0 | 9 | 115 | 124 | 124 | 0 |
| Cis-pentene-2 | 390 | 599 | 220 | 11 | 33 | 44 | 44 | 11 | 0 | 33 | 421 | 454 | 454 | 0 |
| Trans-pentene-2 | 180 | 276 | 101 | 5 | 15 | 20 | 20 | 5 | 0 | 15 | 191 | 206 | 206 | 0 |
| Isoprene | 0 | 0 | 0 | 0 | 35 | 35 | 1,735 | 150 | 0 | 1,585 | 446 | 481 | 481 | 0 |
| Dimethyl acetylene | 0 | 0 | 0 | 0 | 0 | 0 | 86 | 86 | 0 | 0 | 0 | 0 | 0 | 0 |
| Valylene | 0 | 0 | 0 | 0 | 0 | 0 | 16 | 16 | 0 | 0 | 0 | 0 | 0 | 0 |
| Piperylenes | 0 | 0 | 0 | 0 | 0 | 0 | 78 | 78 | 0 | 0 | 0 | 0 | 0 | 0 |
| Cyclopentadiene | 0 | 0 | 0 | 0 | 0 | 0 | 60 | 60 | 0 | 0 | 0 | 0 | 0 | 0 |
| Solvent | 0 | 0 | 0 | 0 | 0 | 0 | 0 | 0 | 1,500 | 0 | 0 | 0 | 0 | 0 |
| Polyisoprene | 0 | 0 | 0 | 0 | 0 | 0 | 0 | 0 | 0 | 0 | 0 | 0 | 0 | 1,550 |
| Total, lbs./hr | 1,949 | 1,001 | 1,001 | 1,949 | 587 | 2,536 | 2,536 | 422 | 1,500 | 2,114 | 7,482 | 9,596 | 8,069 | 1,550 |

Note.—Numbers in parentheses are stream numbers.

The isoprene content of stream 9 is thus converted to polyisoprene without the usual, very expensive separation steps generally used to first separate the isoprene in stream 9 into a very high purity product and then follow with polymerization of the high purity product. By removing the catalyst poisons, which in my process are low in volume, by a relatively low cost separation step, the isoprene produced by my process is polymerizable in the presence of any other impurities present.

The operational data presented illustrate the effectiveness of my process in producing effective quantities of polyisoprene from the original feed stream of low-value mixed amylenes treated. The following process discussion can be more readily understood having in mind the preceding flow-sheet description and material balance.

In my process as I have described an embodiment hereinabove, the feed stream is initially treated by molecular sieves. It is important to have high purity isoamylenes in order to reduce subsequent processing problems and potential catalyst-poison problems in downstream equipment. By separating out the n-amylenes, and of course by subsequently isomerizing them to isoamylenes, the overall feed stock of isoamylenes required is reduced, poisons from dehydrogenation of n-amylenes such as piperylene are not produced, and energy loads needed to carry the n-amylenes through the system are eliminated.

Molecular sieves have proven highly effective in efficiently separating n-amylenes out of the mixed amylene stream, thus leaving a high purity isoamylene stream for subsequent conversion to isoprene. The molecular sieves or zeolites to which I refer include any of the materials commonly so termed, such as those known commercially as Type A, Type X, and Type Y, and the term further includes the mordenites. Molecular sieves are described with some particularity in an article by D. W. Breck in 41 Journal of Chemical Education 678 and following, December 1964. I specifically incorporate the material of this article for detailed descriptions of molecular sieves in their various types.

The molecular sieves have a highly porous structure which has an affinity for molecules of definite size and shape. Molecular sieves are available with pore sizes of a very wide range usually measured in angstrom units. Those suitable for separation of the n-amylenes from isoamylenes are of about 4.5 to 5.5 angstrom units, preferably 5 A. Molecular sieves are commercially available in various physical forms, such as granular forms of ⅛ to ¼ inch pellets, beads, finely divided forms up to 200 mesh. The particular physical form of the molecular sieve material does not affect the pore diameter of the sieve.

Process conditions for contacting the molecular sieves with the mixed amylenes stream can vary considerably. If conducted with vapor-phase amylenes, the contacting temperature can be from about 100 to 300° F., more usually from about 125 to 200° F. If conducted with liquid-phase amylenes, the contacting temperature can be from atmospheric to about 150° F. The contacting pressure can be from atmospheric to about 100 p.s.i.g., depending on vapor or liquid-phase operation. If liquid, a sufficient pressure is employed to maintain substantially liquid conditions at the contacting temperature. A space velocity of from about 0.1 to 10 liquid volumes of the mixed amylenes stream per volume of molecular sieve per hour, preferably from about 1 to 5 volumes, is suitable.

Contacting of the mixed amylene stream can be carried out in any suitable zone, such as fixed bed, moving bed, or the like, known to the art. Parallel beds can be employed, if desired, so that the process can continue in operation with one bed being desorbed and the alternate bed continuing on stream, and vice versa. Contacting time will vary from about 1 to 10 minutes.

As the molecular sieves approach saturation with adsorbed n-amylenes, desorption is required in order to recover the n-amylenes for subsequent skeletal isomerization. Several methods of desorption are known to the art, including thermal swing, pressure swing, purge gas stripping, and displacement. I find the thermal swing method employing a different temperature level for adsorption and desorption to be convenient. For desorption, the molecular sieves are heated to a temperature at which their adsorptive capacity is reduced to a relatively low level, so that the adsorbate leaves the molecular sieve pore surfaces and is readily removed by a small stream of purged gas such as hydrogen, nitrogen, methane, or the like. This can be done by operating at reduced pressure, if desired. Desorption temperatures of from about 200 up to 600° F. are useful. After desorption, the stripped molecular sieves are cooled and returned to service for adsorption of additional n-amylenes.

The n-amylenes are converted at least in part to the corresponding isoamylenes substantially without polymerization or other destructive reactions by contacting at elevated temperatures a solid catalyst such as bauxite. A suitable skeletal isomerization process is described in United States Letters Patent 2,395,274 to Hillyer and Drennan. In the described process, n-olefins, either alone or with a substantially inert diluent material such as saturated hydrocarbons, steam, or the like, are contacted with the catalyst at temperatures of from about 500 to 1300° F. The catalyst, bauxite preferably, has previously been activated or dehydrated by calcining at elevated temperatures. Space velocities of from about 100 to 1500 volumes per volume of catalyst space per hour, and atmospheric to slightly superatmospheric pressures, are normally used to produce high yields of the iso product. Pressures of from about 15, or somewhat below, upward toward 100 pounds gauge, rather than higher pressures, are utilized to avoid appreciable polymer formation.

Another method of skeletal isomerization of n-amylenes employs an alumina catalyst which has been activated at temperatures of from about 1100 to 1400° F. Such catalysts include $\eta$-alumina, $\gamma$-alumina, modified aluminas such as alumina-boria, and the various halogen compound-treated aluminas. The activated alumina catalyst is utilized to isomerize the n-amylenes at contacting temperatures in the range of from about 400 to 1000° F., preferably 600 to 900° F. Similar pressures are utilized for these catalysts as described for the bauxite catalyst process. The olefin feed to the reaction zone usually will have a liquid hourly space velocity measured at 60° F. of from about 0.01 to 30 volumes of liquid per volume of catalyst per hour, preferably from about 1 to 20.

The isoamylenes stream which has been passed through the molecular sieves is relatively free of n-amylenes as has been shown by the data in Table I. This stream, then, is subjected to dehydrogenation, preferably oxidative dehydrogenation. Normally at least a part of the unreacted materials separated from the products of polymerization are returned to the dehydrogenation zone. While such recycle stream contains minor amounts of isoprene, the stream also contains desirable quantities of isoamylenes which can be converted to additional isoprene. The minor content of isoprene is not changed in the oxidative dehydrogenation process, and does not interfere in such process. The feed stream to the dehydrogenation zone comprises essentially the isoamylenes 3-methylbutene-1, 2-methylbutene-1, and 2-methylbutene-2. A substantial proportion of the isoamylenes in the stream are converted to isoprene under dehydrogenation conditions. The conversion does not have to be total by any means, and more usually is of the order of 80 percent conversion. Any isoamylenes remaining unconverted simply pass through the polyisoprene reaction unchanged and unpolymerized, and are subsequently separated and recycled.

In the dehydrogenation zone, any suitable oxidative dehydrogenation catalyst for olefins can be employed such as a catalyst composed of 3 percent chromium oxide, 3 percent potassium carbonate and the balance iron oxide. Steam can be supplied where steam-active catalysts are used. A particularly suitable catalyst for this purpose is a potassium based material composed of 51 to 59 percent by weight of potassium carbonate, 40 to 49 percent by weight of chromium oxide, and 1 to 10 percent by weight of iron oxide. With this particular catalyst, satisfactory conversion of the isoamylenes to isoprene can be obtained at temperatures of from about 1100 to 1250° F., pressures of from about 15 to 30 p.s.i.a., with gaseous hourly space velocities of from about 300 to 1000, and using steam to hydrocarbon ratios of from about 5:1 to 20:1. Following dehydrogenation, the effluent can be passed to a fractionator or gas concentration unit for removal of methane, hydrogen, other light gases, water, and then condensed.

The stream effluent from oxidative dehydrogenation is purified for removal of potential polymerization catalyst poisons by extractive distillation utilizing a selective solvent which is selective toward acetylenes, cyclopentadiene, and other potential polymerization catalyst poisons. Suitable solvents include sulfolane, furfural, methyl Carbitol, ethyl Carbitol, acetonitrile, ethylene diamine, alkylene carbonates, lactones, ethylene glycol, diethylene glycol, and the like. The selective solvent is normally introduced into the top of the extractive distillation column. The catalyst poisons and a small proportion of isoprene are separated with the solvent as bottoms. Typically, the extractive distillation column can be operated with a top temperature of from about 100 to 150° F., and a bottom temperature of from about 175 to 325° F. A particularly useful method of extractive distillation is disclosed in my copending application 789,286, filed Jan. 6, 1969, now United States Letters Patent 3,583,966 issued June 8, 1971.

The stream containing isoprene together with minor amounts of isoamylenes and other components is then conducted to the polymerization zone. This stream normally is joined by components unpolymerized in polymerization and which have been separated from the polymer product and recovered for recycle. Polymerization usually effects about 80 percent conversion of isoprene to polyisoprene, though this will depend on polymerization conditions and catalysts. In the polymerization of a relatively low-concentration isoprene stream, typically can be used a lithium catalyst such as 3-bromophenyl lithium as described in United States Letters Patent 3,215,679 to Trepka. Polymerization can be accomplished at temperatures ranging from about $-20$ to $+100°$ C., under pressures of from about 50 to 500 p.s.i.g.

Normally the polymerization will be accomplished in a solution process utilizing as solvent the isoamylenes and other amylenes which are separated from the reactor effluent and recycled as previously mentioned. If the amylenes are insufficient to effect solution polymerization of therein contained isoprene, then an extraneous solvent such as n-hexane can be added. This is recovered by separation from the polymerization effluent and recycled as shown on my flow-sheet.

The effluent from the polymerization zone or reactor is separated into the desired polyisoprene product, while unreacted isoprene and other components are recycled back to polymerization or to the oxydehydrogenation step as hereinbefore discussed.

Separation of polymer from unreacted components, and from polymerization solvent, if any, can be by means known to the art in an appropriate stripper or separator. For example, steam stripping is effective and a method of steam stripping to produce rubber from an aqueous phase is described in United States Letters Patent 3,190,868, issued to Mitacek et al.

In the aforegoing discussions I have disclosed my process, described it in detail as to the flow-sheet drawing accompanying this specification, have shown stream compositions for the various steps in my process, have shown specifically how each step can be practiced, and shown the effectiveness and efficiency of my process.

Reasonable variations and modifications are possible within the scope of this disclosure without departing from the scope and spirit thereof.

I claim:
1. A process for preparing polyisoprene from a first stream of mixed amylenes, said first stream including n-amylenes, and isoamylenes, which comprises:
   (a) selectively adsorbing said n-amylenes from said first stream into molecular sieves and passing therethrough a second stream consisting essentially of isoamylenes,
   (b) desorbing said n-amylenes from said first stream thereby forming a third stream consiting essentially of n-amylenes.
   (c) passing said third stream through a skeletal isomerization zone under skeletal isomerization conditions and thereby skeletally isomerizing at least a portion of said n-amylenes to isoamylenes and forming a further mixed amylenes stream,
   (d) recycling said further mixed amylenes stream from said skeletal isomerization zone of said step (c) back to said step (a),
   (e) passing said second stream through a dehydrogenation zone under dehydrogenation conditions and thereby converting at least a portion of said second stream to isoprene together with minor amounts of undesirable unsaturates comprising acetylenes and dienes,
   (f) extractively distilling the effluent from the dehydrogenation zone of said step (e) and thereby removing said undesirable unsaturates and leaving a purified stream containing isoprene,
   (g) polymerizing said purified stream containing isoprene from said step (f) in a polymerization zone under polymerization conditions and thereby polymerizing at least a portion of said isoprene to polyisoprene.
2. The process according to claim 1 wherein said step (g) is followed by:
   (h) separating said polyisoprene as a product from unreacted components, said unreacted components including isoamylenes and isoprene,
   (i) separating said isoamylenes from said isoprene,
   (j) recycling said isoamylenes to said step (e),
   (k) recycling said isoprene to said step (g).
3. The process according to claim 2 wherein said dehydrogenation conditions are oxidative dehydrogenation conditions.
4. The process according to claim 3 wherein is further added in said step (e) additional isoprene, in said step (g) is added a polymerization solvent, and in said step (h) said polymerization solvent is separated and recycled to said step (g).
5. The process according to claim 1 wherein said molecular sieves have a pore diameter of from about 4.5 A. to 5.5 A.
6. A process for preparing polyisoprene from a first stream consisting of a refinery $C_5$ cut comprising essentially n-amylenes and isoamylenes, which comprises:
   (a) contacting said first stream with molecular sieves having a pore diameter of from about 4.5 A. to 5.5 A. in a separation zone and thereby selectively adsorbing from said first stream said n-amylenes on said molecular sieves, the remaining components of said first stream comprising a second stream comprising essentially said isoamylenes,
   (b) contacting said second stream with a selective catalyst in a dehydrogenation zone under dehydrogenation conditions and thereby selectively converting at least a portion of said isoamylenes to isoprene and minor amounts of polymerization poisons,
   (c) extractively distilling said converted stream containing minor amounts of unsaturated polymerization poisons from said step (b) and thereby producing a purified stream essentially free of said polymerization poisons,
   (d) polymerizing under polymerization conditions said purified stream from said step (c) and thereby producing an effluent stream consisting essentially of polyisoprene, unreacted isoprene, and isopentenes,
   (e) recovering said polyisoprene as a product.
7. The process according to claim 6 wherein said step (e) comprises further the steps of:
   separating said effluent stream into unreacted isoprene, isopentenes, and polyisoprene,
   recycling said unreacted isoprene to said step (d),
   recycling said isopentenes to said step (c),
   periodically desorbing said n-amylenes from said molecular sieves in said step (b) and wherein said step (b) said dehydrogenation conditions are oxidative dehydrogenation conditions.
   passing said desorbed n-amylenes to a skeletal isomerization zone under skeletal isomerization conditions and thereby converting at least a portion of said n-amylenes to additional isoamylenes,
   recycling said additional isoamylenes to said step (a).
8. The process of claim 7 wherein said skeletal isomerization catalyst is selected from at least one of an alumina of modified moisture content and bauxite.
9. The process of claim 7 wherein in said step (c) the said polymerization poisons include acetylenes and cyclopentadiene.
10. The process of claim 9 wherein said extractive distillation step (c) employs sulfolane as extractive solvent for said polymerization poisons.

References Cited

UNITED STATES PATENTS

| 3,150,202 | 9/1964 | Holt et al. | 260—683.2 |
| 3,296,241 | 1/1967 | Berger | 260—94.2 |
| 3,448,164 | 6/1969 | Holm et al. | 260—683.2 |

FOREIGN PATENTS

| 1,302,684 | 1962 | France | 260—677 |

JOSEPH L. SCHOFER, Primary Examiner

W. F. HAMROCK, Assistant Examiner

U.S. Cl. X.R.

260—677, 683.2 R